United States Patent

[11] 3,610,415

| [72] | Inventor | Charles K. Deak<br>Warren, Mich. |
|---|---|---|
| [21] | Appl. No. | 820,793 |
| [22] | Filed | May 1, 1969 |
| [45] | Patented | Oct. 5, 1971 |
| [73] | Assignee | Frankel Company, Inc.<br>Detroit, Mich. |

[54] METHOD OF DRY SEPARATION OF LESS DENSE METAL PARTICLES FROM MORE DENSE METAL PARTICLES AND APPARATUS THEREFORE
1 Claim, 2 Drawing Figs.

| [52] | U.S. Cl. | 209/466, 209/486 |
|---|---|---|
| [51] | Int. Cl. | B07b 3/02 |
| [50] | Field of Search | 209/138, 139, 466, 474, 502, 504, 486, 423, 302, 422, 467–469 |

[56] References Cited
UNITED STATES PATENTS

| 2,275,849 | 3/1942 | Fraser | 209/466 |
| 2,310,894 | 2/1943 | Brusset | 209/467 |
| 2,942,792 | 6/1960 | Anderson et al. | 209/2 X |
| 3,161,483 | 12/1964 | Morris | 209/466 X |
| 3,261,463 | 7/1966 | Eveson et al. | 209/11 |
| 3,288,282 | 11/1966 | Eveson et al. | 209/11 |

*Primary Examiner*—Tim R. Miles
*Assistant Examiner*—Ralph J. Hill
*Attorney*—Cullen, Sloman & Cantor ABSTRACT: The method of dry separating a mixture of dense scrap particles from less dense scrap particles such as aluminum or Titanium, which includes confining a finely divided media of metallic particles of a specific gravity greater than said less dense particles upon a perforate support, fluidizing said media by delivering continuously a flow of compressed gas upwardly through said media modifying said media producing an apparent specific gravity less than the dense particles and introducing said scrap particle mixture into the fluidized medium and floating off from the said media the less dense scrap particles; and the apparatus for carrying out said method.

PATENTED OCT 5 1971 3,610,415

INVENTOR
CHARLES K. DEAK
BY Allen Homan, & Canton
ATTORNEYS

METHOD OF DRY SEPARATION OF LESS DENSE METAL PARTICLES FROM MORE DENSE METAL PARTICLES AND APPARATUS THEREFORE

BACKGROUND OF THE INVENTION

When melting titanium ingots, it is an economic necessity to use a certain percentage of scrap in the charge to be melted. However, at the present there is a danger in the use of scrap in the melting of titanium ingots which are to be used in critical aerospace applications. The danger lies in the fact that the titanium scrap might be contaminated with certain high-melting-point metals which will not melt during the melting of the titanium ingot and form "dense inclusions" in the same. The metals which would fall into this category would be molybdenum tungsten, columbium (niobium), tantalum; their carbides and possibly their ferroalloys (such as ferrotungsten). Consequently, it is of prime importance that the "dense inclusion" forming metal contaminations should be removed from the titanium scrap.

Titanium scrap suitable for remelting comes in several different forms. The removal of the above-discussed contaminations does not represent any problem if the scrap is in the form of large solids as individual testing of the pieces is economically permissible. On the other hand, there are two forms of scrap where individual testing is impossible, according to today's state of the arts. These forms are metal chips and metal "stamps." Metal chips are basically crushed metal turnings, drillings, borings, shavings, etc. which are suitably prepared for vacuum melt operation (degreasing, removing of magnetic contaminations, etc.). Metal stamps are sheet metal or light forging scrap reduced to small, approximately postage stamp or smaller size. This reduction is size can be accomplished by different mechanical means like shearing, crushing, etc.

The removal of the dense inclusion forming contamination can be accomplished in some instances by magnetic separation if the contamination lends itself to such a separation. Materials falling in this category would be tungsten carbide, some of the ferroalloys, etc. The pure metals (Mo, W. Cb, Ta) cannot be removed by magnetic separation, and consequently, other means have to be found for their removal. The most striking difference between the above-mentioned metals and titanium is the difference in density. The following table gives an illustration of the difference in densities:

| METAL | g./cm.$^3$ (Water=1) | Densities lb./in.$^3$ | Relative Density (Titanium=1) |
|---|---|---|---|
| Titanium | 4.50 | 0.163 | 1.00 |
| Molybdenum | 10.22 | 0.369 | 2.27 |
| Tungsten | 19.3 | 0.697 | 4.29 |
| Columbium | 8.57 | 0.310 | 1.90 |
| Tantalum | 16.6 | 0.600 | 3.69 |
| (Iron | 7.87 | 0.284 | 1.75) |

There are several ways the denser metals could be removed from the titanium. The simplest would be the application of a heavy liquid which has a density in between the titanium and the lightest of the above contaminating metals. However, up to the present no such liquid has been produced in industrial quantities at an economic price. Consequently, at the present, we can consider the "sink and float" method impractical.

Another method would be tabling like used in the mineral-dressing industry. However, both wet and dry tables require a very close sizing of the feed, furthermore, the shape of chips or stamps is not the best for tabling methods.

Jigging is possibly a very promising method. Its disadvantages are: "messy" operation (involves large amounts of water); requires redrying of the stamps, and the "shape-factor" is significant.

BRIEF DESCRIPTION OF THE INVENTION

The present invention is directed to a method of separating a mixture of dense scrap particles from less dense scrap particles, such as titanium, which is more effective than previous methods and which in a dry process is highly efficient in producing a mechanical separation of the less dense particles, such as the titanium, from the more dense particles.

It is another object of the present invention to provide a process by which the mixture of scrap particles is delivered to the fluidized bed which includes a media of finely divided metallic particles supported and restrained within a housing; said media being fluidized by a compressed gas passing therethrough for providing in said media apparent or actual specific gravity less than that of the denser materials to be separated.

It is another object in the present process to float off from the surface of the fluidized dry metallic media; the lightest scrap particles, such as the titanium, the remainder or denser particles sinking to the bottom of the said media.

It is another object to provide apparatus for carrying out the present method.

These and other objects will be seen from the following specification and claims in conjunction with the appended drawing in which:

Figure 1:
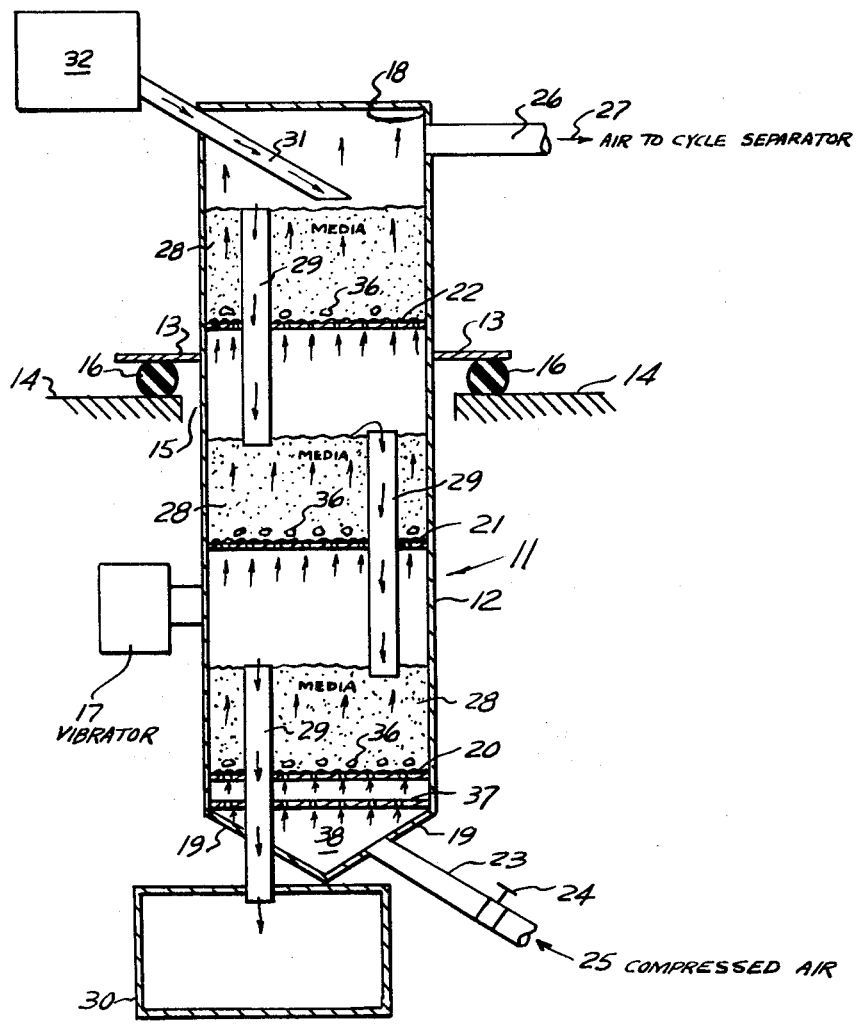
FIG. 1 is a schematic elevational view of the apparatus for carrying out the present method.
Figure 2:
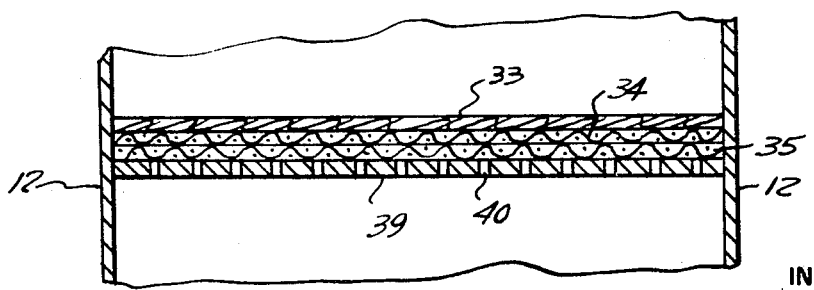
FIG. 2 is a fragmentary broken away sectional view illustrating the construction of the media support.

Figs 1 and 2 illustrate one form of apparatus for carrying out the present method; said separator apparatus generally indicated at 11 includes an elongated upright housing 12. Said housing includes laterally disposed side plates 13 for suspending said housing through the aperture 15 in the support 14 fragmentarily shown and with suitable flexible cushioning interposed such as the rubber mounts 16 or springs to thus provide a yieldable mounting for said housing.

The vibrator assembly 17 is connected to said housing and in the illustrated form, is mounted upon its sidewall 18. Said housing includes the pair of downwardly extending converging bottom walls 19. It is contemplated that the vibrator may be separate from the housing but suitably connected thereto.

Though one screen support may be employed, as shown in further detail in FIG. 2, in the illustrative embodiment there are provided a series of longitudinally spaced screen supports 20, 21 and 22, which extend between the sidewalls of the housing intermediate the top and bottom walls, as shown in FIG. 1.

The compressed gas inlet means designated at 23 is in the form of a conduit with control valve 24 and adapted for a connection to a source 25 of compressed gas, such as compressed air. The compressed gas may be air, for illustration, supplied at pressures in the range of 40–100 pounds per square inch. This compressed gas is delivered into the plenum chamber 38 for delivery up through the respective screen assemblies, 20, 21, and 22.

The housing is vented to permit the escape of said upwardly moving air. For this purpose there is provided in the illustrated form of the apparatus, an outlet 26 adjacent the upper end of the housing, which is adapted for connection as at 27 to a cycle separator or equivalent mechanism for preventing the release to atmosphere of dust or other pollutants.

Applied to each of the respective perforated supports, 20, 21 and 22, there is provided a granular media of lead, in the range 10–100 mesh, for example, or other suitable metallic particles, normally having a specific gravity greater than the titanium particles to be separated in accordance with the process hereafter defined.

A series of upright outlet conduits 29 are mounted within said housing. These conduits at their upper ends are normally arranged adjacent to or slightly below the surface of the media 28 after it has been fluidized. Said conduits respectively extend downwardly through the media and the adjacent perforated support and communicate as with the upper two conduits 29 with the adjacent below media 28 and with the latter lowermost conduit 29 with a suitable closed storage 30 adapted in receive the separated or floated off titanium scrap particles.

Housing 12 has provided adjacent its upper end a scrap entry shute 31 which includes a closed scrap supply at 32 adapted for delivery of the scrap mixture of particles to be separated down through shute 31 into the media 28; namely, the uppermost media in FIG. 1.

The perforated supports 20, 21 and 22 are shown on an enlarged scale in FIG. 2 as consisting of a plurality of superimposed screens. The finest screen 33 may be of a suitable textile fabric and therebelow is an intermediate mesh screen 34 (30 to 50 mesh) and therebelow, a support screen 35 of coarser character, (6 to 10 mesh, approximately) provided for rigidity but adapted to permit the upward flow of the compressed air. A bottom support plate 39 is also employed, having a plurality of apertures 40.

In the process as hereunder described, the less dense particles of the scrap mixture, such as titanium or aluminum, for illustration, will float off media 28 and descend by gravity through the respective conduits 29 with the more dense scrap particles, such as those heavier than titanium, or aluminum, as for example, particles of molybdenum, tungsten, columbium, tantalum, etc., dropping in the media towards the respective perforated support as shown at 36.

In order to insure a homogenous flow of compressed air up through the respective supports, there is shown for illustration, as covering the plenum chamber 38 at the bottom of the housing finely perforated baffle 37 or diffuser plate to thus assure that the compressed air will move uniformly upward through the pulverized media 28 respectively for fluidizing the same.

As hereunder explained in further detail, the floated off scrap particles, the lightest density, such as the titanium or aluminum pass from the uppermost conduit 29 into the intermediate media 28 for a refining step and wherein, the intermediate media again floats off the less dense or titanium particles with any more dense particles which weren't separated in the first instance settling towards the bottom of the intermediate perforated support 21 as shown at 36. The process again repeats through the intermediate conduit 29 into the lowermost media 28 after which the relatively pure titanium scrap passes through the lowermost conduit 29 into the closed storage chamber 30.

PROCESS OF THE PRESENT INVENTION

The present process may be regarded as a fluidized dry bed method which includes the following steps: essentially, the present method is used in conjunction with the melting to titanium ingots from scrap which contains chips and stamps or particles of titanium and denser metals; the method including separation of a mixture of said dense scrap particles from the titanium scrap which comprises these steps:

1. Confining a finely divided media of metal particles of a specific gravity greater than titanium upon a perforate support such as the respective supports 20, 21 and 22, FIG. 1. In the present method and for illustration, a finely divided mass of lead particles 28 is employed which is normally of a specific gravity greater than that of the titanium scrap particles.

2. Fluidizing the lead particle media by directing continuously a flow of gas under pressure such as compressed air in the range of 40-100 pounds per square inch up through all areas of the respective media thus fluidizing said media and providing therein an apparent usable specific gravity which is less than the denser particles which make up the original scrap mixture.

3. Introducing the scrap particles mixture into the fluid media such as from the storage 32 through the delivery shute 31, FIG. 1. Additional media such as granular lead may be added to the scrap at storage area 32.

4. Floating off from the upper surface of the said media, the titanium scrap particles, such as stamps or chips or for that matter, the least dense constituent of the said scrap mixture, the denser particles making up the mixture such as designated at 36, floating to the bottom of the respective media 28.

While the illustrative apparatus, FIG. 1, illustrates the series of media 28, it is contemplated that the apparatus could be limited to a single media for accomplishing the intended results. It has been found, however, that by using plural-spaced media on plural-spaced supports 20, 21, and 22 that a better and more perfectly separated end product is achieved since the second and third outlets 29 are delivering a more completely separated and pure titanium scrap. There is always the possibility that in the floating off process, some titanium scrap may have adhered thereto or move with it more dense particles which will be entrapped in the successive media.

An advantage of the present process is that the dry media is provided and with the media of metallic particles fluidized by the application of the compressed air or other gas and with the separation being a floating off of the less dense scrap mixture element since it has a comparatively lighter specific gravity than the fluidized media, the heavier dense scrap elements sinking to the bottom of the fluidized media and collecting as at 36 upon the respective supports.

The operation of the present apparatus is improved by the use of a vibrator 17 to thus assure uniform further distribution or aeration of the metallic particles which make up the media 28 as said gas moves upwardly through the housing and through the outlet 26. A yieldable floating mounting is provided for said housing for dampening the vibrations against transmission to the support 14 as much as possible.

While the present apparatus has been designed particularly for the separation of titanium scrap from scrap metals of higher specific gravity, the apparatus and the method are not limited to the separation of titanium scrap but may be employed in the present method of separating any two or more scrap materials of small form which are of differing specific gravities. Only being required that the metallic fluidized media 28 have an apparent or usable specific gravity which is such that lighter or less dense of the scrap elements will float off for separation and remainder or more dense particles of the scrap mixture will settle and be collected upon the respective perforated supports 20, 21 and 22.

The addition of granular lead media to the scrap at 32 provides for an excess of fluidized media and to assist in the floating off of the least dense particles into outlet 29.

Having described my invention, reference should now be had to the following claims.

I claim:

1. An improved process for recovering titanium from scrap materials containing physical contaminants of greater density than the titanium which comprises the steps of:

suspending a bed of granular lead particles of between about 10-100 mesh on a horizontal perforated support;

fluidizing said bed of lead particles by directing a diffused flow of pressurized gas upwardly through said bed to create an apparent specific gravity of said bed intermediate the specific gravities of titanium and the heavier contaminants;

vibrating said perforated support to enhance the fluidizing action of the diffused gas flow;

and introducing the scrap titanium material into said fluidized bed;

whereby the denser contaminants settle to the bottom of said fluidized bed and the titanium floats off the upper surface of said fluidized bed.